United States Patent
Plotnick et al.

(10) Patent No.: US 8,621,511 B2
(45) Date of Patent: Dec. 31, 2013

(54) SYSTEM AND METHOD TO CONTROL DISTRIBUTE PROCESSING AND MEMORY RESOURCES AMONG APPLICATIONS IN A TELEVISION TERMINAL

(75) Inventors: Bruce Plotnick, Jamison, PA (US); George Edward Breen, Wyncote, PA (US); Ayisha Mertens, Lansdale, PA (US)

(73) Assignee: Cox Communications, Inc., Atlanta, GA (US)

( * ) Notice: Subject to any disclaimer, the term of this patent is extended or adjusted under 35 U.S.C. 154(b) by 3403 days.

(21) Appl. No.: 10/258,980

(22) PCT Filed: May 3, 2001

(86) PCT No.: PCT/US01/14300
§ 371 (c)(1),
(2), (4) Date: Oct. 30, 2002

(87) PCT Pub. No.: WO01/84824
PCT Pub. Date: Nov. 8, 2001

(65) Prior Publication Data
US 2003/0227567 A1 Dec. 11, 2003

Related U.S. Application Data

(60) Provisional application No. 60/201,512, filed on May 3, 2000.

(51) Int. Cl.
*G06F 3/00* (2006.01)
*G06F 13/00* (2006.01)
*H04N 5/445* (2011.01)

(52) U.S. Cl.
USPC ............ 725/39; 725/43; 725/51; 725/52

(58) Field of Classification Search
USPC ........... 725/40, 39, 52, 37, 112, 113, 60, 132, 725/140, 53, 43, 44; 348/552, 734
See application file for complete search history.

(56) References Cited

U.S. PATENT DOCUMENTS

| | | | | |
|---|---|---|---|---|
| 5,377,317 A | * | 12/1994 | Bates et al. | 715/789 |
| 5,479,268 A | * | 12/1995 | Young et al. | 386/291 |
| 5,563,648 A | | 10/1996 | Menand et al. | |
| 5,583,563 A | | 12/1996 | Wanderscheid et al. | |
| 5,752,032 A | * | 5/1998 | Keller et al. | 719/311 |
| 5,801,696 A | * | 9/1998 | Roberts | 715/781 |
| 5,973,684 A | | 10/1999 | Brooks et al. | |
| 6,665,869 B1 | * | 12/2003 | Ellis et al. | 725/39 |

(Continued)

*Primary Examiner* — Mushfikh Alam
(74) *Attorney, Agent, or Firm* — Merchant & Gould (57) ABSTRACT

A television converter system (16) comprises a receiver (94) for receiving a transmission signal from a transmission signal source. A processor (24) in the converter is capable of executing a plurality of independently executable application programs. A first one of the plurality of programs has a focused execution state. The remaining one or more application programs have a defocused execution state. The processor generates an application program output signal from the application program that currently has the focused execution state. An output provides either the transmission signal or the application program output signal for display on a television display. An input is received, requesting a transfer of focus from the first one of the plurality of programs to a second one of the plurality of application programs. The focus is transferred from the first application program to the second one of the plurality of programs for display on the television display.

15 Claims, 4 Drawing Sheets

(56) References Cited

U.S. PATENT DOCUMENTS

| | | | |
|---|---|---|---|
| 6,857,128 B1* | 2/2005 | Borden et al. | 725/39 |
| 6,883,176 B1* | 4/2005 | Grooters | 725/39 |
| 7,607,150 B1* | 10/2009 | Kobayashi et al. | 725/41 |
| 2004/0107437 A1* | 6/2004 | Reichardt et al. | 725/37 |
| 2004/0107439 A1* | 6/2004 | Hassell et al. | 725/44 |
| 2005/0177850 A1* | 8/2005 | Boylan et al. | 725/53 |
| 2005/0273832 A1* | 12/2005 | Zigmond et al. | 725/112 |
| 2005/0278768 A1* | 12/2005 | Boyer et al. | 725/113 |
| 2005/0283800 A1* | 12/2005 | Ellis et al. | 725/40 |

* cited by examiner

SYSTEM AND METHOD TO CONTROL DISTRIBUTE PROCESSING AND MEMORY RESOURCES AMONG APPLICATIONS IN A TELEVISION TERMINAL

This application claims the benefit of U.S. Provisional patent application No. 60/201,512, filed May 3, 2000, which is hereby incorporated by reference in its entirety.

FIELD OF THE INVENTION

The present invention relates to television based services generally, and more specifically to a system and method for controlling and distributing the system resources of television converter equipment.

U.S. Pat. Nos. 5,961,603 and 5,999,970 are expressly incorporated by reference herein in their entireties. These patents teach a real-time system and method for accessing Internet-based and other information through a television distribution network. The patents enable a user to access and view information that is located at various information sources, such as the Internet, including information that is related to the programming content of a currently viewed television broadcast.

In today's market, television systems offer various television services, including interactive services such as video-on-demand, television based Internet access, e-commerce and electronic program guides. As the number and sophistication of television based services being offered continues to expand, a need exists for a system that can manage the various programs that can be accessed using the set top converter box and television display. Such a system is desirable to manage and control the system resources in order that television viewers may easily access and utilize the many services offered by television operators.

SUMMARY OF THE INVENTION

A television converter system comprises a receiver for receiving a transmission signal from a transmission signal source. A processor in the converter is capable of executing a plurality of application programs. A first one of the plurality of programs has a focused execution state. The remaining one or more application programs have a defocused execution state. The processor generates an application program output signal from the application program that currently has the focused execution state. An output provides either the transmission signal or the application program output signal for display on a television display. Means are provided for receiving an input requesting a transfer of focus from the first one of the plurality of programs to a second one of the plurality of application programs. Means are further provided for transferring focus from the first application program to the second one of the plurality of programs for display on the television display.

Another aspect of the invention is a system for operating a television signal converter device. Means are provided for executing a plurality of application programs in a television signal converter device that is capable of receiving and converting a video transmission signal. A first one of the plurality of application programs has a focused execution state for displaying information on a television display. The remaining one or more application programs have a defocused execution state. Means are provided for defocusing the first program that currently has the focused execution state for display on the television display. Means are provided for automatically transferring focus from the first application program to a second one of the plurality of programs for displaying output on the television display.

DETAILED DESCRIPTION

In prior systems in the cable television set top environment and interactive service environment, in order to allow multiple tasks to run in a single set top converter, the tasks were combined (i.e., hard-coded) into a single application system. This was necessary, because there was no middleware layer that could monitor the activities of the various tasks and control the allocation of resources to the tasks. The present invention overcomes this disadvantage of the prior art.

Figure 1:
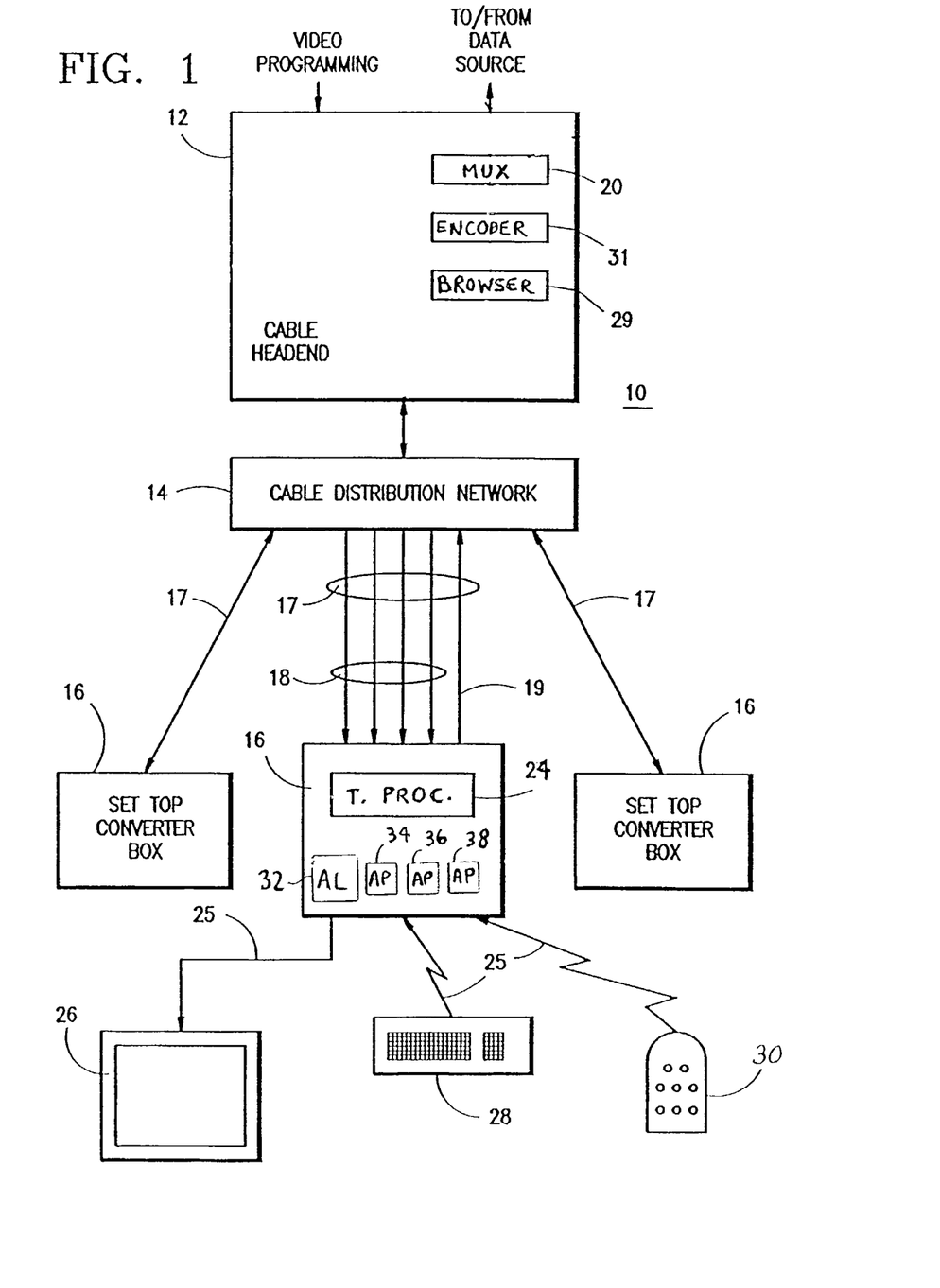
FIG. 1 is a block diagram of an exemplary television system in which a set top converter according to the present invention may be used.

FIG. 1 is a general block diagram of a CATV system 10 which incorporates elements for facilitating the provision of television services and is illustrative of one type of system with which the concepts of the present invention may be employed. It should be noted that the CATV system 10 is illustrated in general form since many of its detailed elements are not necessary for an understanding of the present invention.

The CATV system 10 includes a cable headend 12 and a cable television distribution network 14 for interfacing the headend 12 to a plurality of set top converter boxes 16. A plurality of transmission links 17 interconnects the set top converter boxes 16 with the distribution network 14. Each of the links 17 is illustrated as being bi-directional with a plurality of downstream channels 18 and one or more upstream channels 19. It will be understood by those of ordinary skill in the art that the links in the present invention are not limited to bi-directional links but they may be one directional links. For clarity, the details of only one of the set top boxes 16 and associated elements are illustrated in FIG. 1.

The cable headend 12 receives video programming from remote sources (not shown), and transmits the video programming and other information through the distribution network 14 to the set top boxes 16. Typically, the video programming is received from the remote source in either an analog format, or a digitally compressed or encoded format, such as MPEG 1 or MPEG 2. Cable headend 12 includes cable headend equipment (which may include encoder 31 and multiplexer 20), consumer service unit/digital service unit (not shown), router (not shown) and headend server (not shown). The headend server has a communications controller and an application server that may include browsers 29, billing applications and the like.

Each of the set top boxes 16 is interfaced via a terminal processor 24 and associated communication links 25 (e.g., cables, infrared wireless links, etc.) to a television or monitor 26, and one or more input devices, such as a wireless keyboard 28 and a remote controller 30. Preferably, the remote control device 30 comprises a computer style keyboard, which communicates with the set top converter box 16 by means of a conventional infrared wireless link. Additionally, a pointing device, such as a mouse or the like (not shown), may be used in conjunction with the keyboard 28. Alternatively, the remote control device 30 may also comprise a conventional television remote control.

The set top box 16 also preferably contains an application launcher 32 (also referred to below as, "AL") and one or more application programs 34, 36, 38. The application launcher 32 interfaces with the terminal processor 24 and the application programs 34, 36, 38 to manage the resources of the system and set top box 16. Preferably, the application programs will be video on demand programs, internet access capabilities, and e-commerce programs, such as an interactive program guide or electronic program guide. It will be understood by those in the art that any application program could be contained in the set top box 16 and managed by the application launcher 32, and that the present invention is not limited to the application programs discussed herein.

Each set top box 16 enables a user to select, via an input device 28, 30, for example, one of the downstream channels 18 to be viewed on the television display 26. The user can also select as the output displayed on the television display 26 the output signal of an application program that executes locally 16 or remotely 12.

Figure 2:
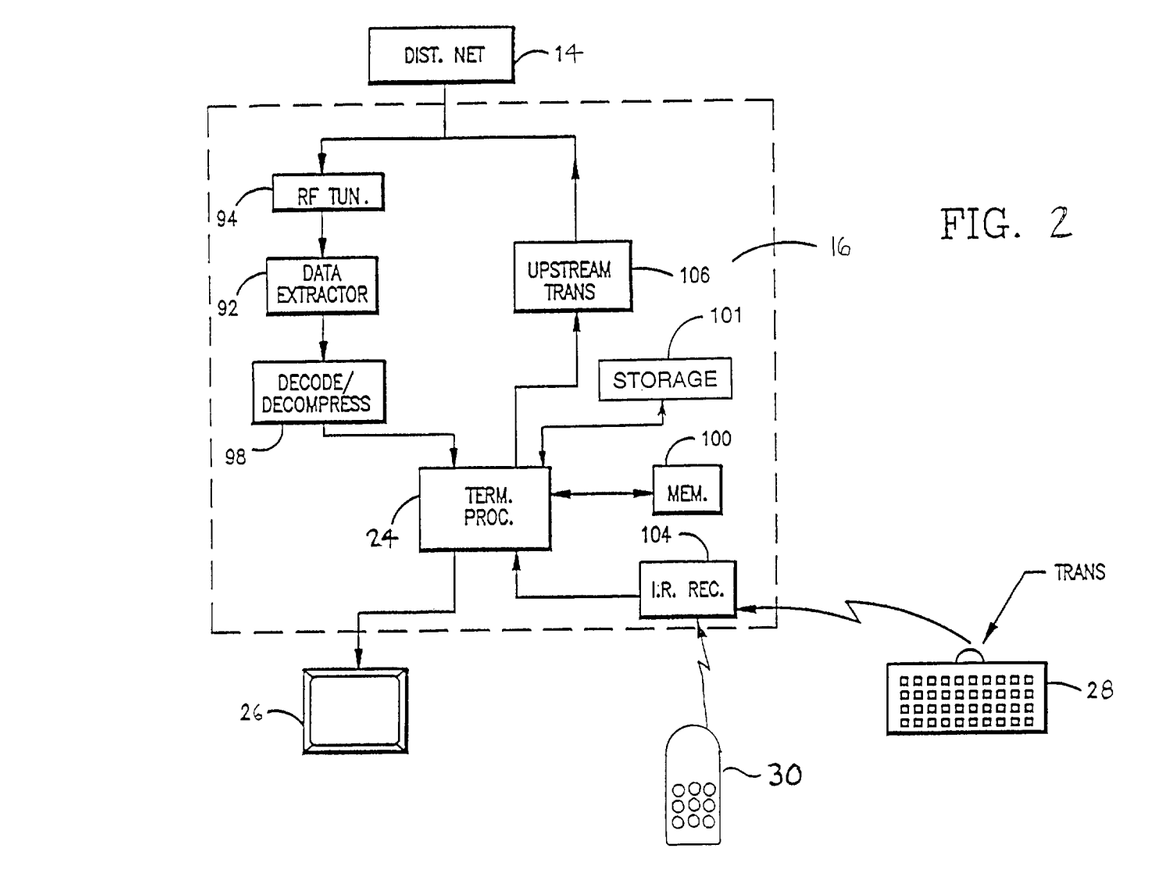
FIG. 2 is a block diagram of the exemplary set top terminal of FIG. 1.

FIG. 2 shows the circuitry that may be contained in the set top converter box 16 of a system that provides interactive television services. It will be understood that the present invention is not limited to interactive television systems, but that the present invention may be utilized to control the resources of a set top box that does not provide interactive services. In the preferred embodiment of an interactive television system, downstream television signals received from the distribution network 14 are fed to a downstream data extractor 92 via an RF tuner 94.

The RF tuner 94 is controlled by the user to select and demodulate one of the downstream channels 18. Additionally, a set top or terminal processor 24 is provided which can also control the RF tuner 94 for selection, in response to information received from the communications controller 70, the one of the downstream channels 18 on which information is received.

The extractor 92 removes the inserted information from the video signal, and forwards it to the terminal processor 24. Preferably, the processor 24 also includes the software for performing the function of decoding and decompressing the video display data. Alternatively, the set top converter box 16 may include a decoding and/or decompression module 98 interposed between the extractor 92 and the processor 24 for performing this function.

The terminal 16 has a main memory 100, which may be random access memory (RAM), such as static RAM (SRAM), dynamic RAM (DRAM), or rambus DRAM (RDRAM). Preferably, the terminal 16 may also have a storage device 101, which may be a permanent (hard) disk drive, read-only memory (ROM), electrically erasable read only memory (EEPROM), or other non-volatile storage medium. Storage device 101 can store computer program code that is used to perform application launching ("AL") functions described below with reference to FIGS. 3 and 4. The application launcher 32 code can be loaded from the storage device 101 into the memory 100 for execution by the processor 24. The code can be updated periodically, or whenever a change is made to the code. Such updates are preferably downloaded from the headend 12 or made directly to the set top box 16. Alternatively, the application launcher 32 code may be downloaded from the network headend 12 (either to memory 100, or to storage device 101) each time the terminal (converter) 16 is turned on.

The terminal processor 24 is interfaced to a memory bank or module 100 which facilitates the various processing functions performed by the processor 24, including production of the video display information from the extracted information, and display of the same on the television display screen 26. The terminal processor 24 also receives commands from a user via the keyboard 28 or other remote control device 30. The remote control 28, 30 preferably includes an IR transmitter 102, which communicates with an IR receiver 104, contained within the set top converter box 16. It will be of course understood that any other type of input arrangement, such as a hard-wired keyboard or mouse, for example, could be employed. The receiver 104 forwards the request to the terminal processor 24, which carries out the received instruction.

As previously discussed, the application launcher ("AL") 32 of the present invention provides an effective means for several application programs 34, 36, 38 to reside and operate in a seamless manner. The application launcher 32 provides a standard environment to which any set top application may interface. Preferably, the application launcher 32 is used in a digital cable system, but it will be understood that the present invention also may be utilized in an analog system. Alternatively, the application launcher 32 may be used with satellite or telephony systems.

Preferably, application programs 34, 36, 38 contained in the set top box 16 register with the application launcher 32 in order that the application launcher 32 may maintain each application's name and launch requirements. The application launcher 32 acts as a controller and intermediary between the various applications 34, 36, 38 contained in a set top box 16, and maintains information about all AL-registered applications 34, 36, 38.

Preferably, the application launcher 32 maintains an input queue which serves to receive and store requests for particular actions. These requests may be received from other application programs 34, 36, 38 or inputted by the user via a remote control device 28, 30.

One of the application programs 34, 36, 38 has the focus at any given time. The program having the focus has access to one or more system resources, such as the ability to run graphics, on screen display, tuner, user interface, and the light emitting diode (LED) display on the set top converter 16 (which may display the received channel or time, for example, or other information). Defocused programs can run in the background at the same time that the focused program is running. Defocused programs do not have access to all of the system resources.

The application launcher 32 shifts focus between various application programs 34, 36, 38 by certain events that may occur, such as certain key presses by a user ("hot keys") on the wireless keyboard 28 or remote control device 30, the termination of an application program 34, 36, 38, a request from an application to obtain the focus, or even an emergency event, such as an emergency broadcast signal. When a user input key is received, the application launcher 32 will analyze the key press to determine whether the key press requires a change in focus of the system resources. In the event the key press does not require any change in focus or is a key press for the currently focused application, no focus change occurs in the system. If the key press received is one that requires a change in focus (i.e., is a hot key), the system resources are defocused from the currently running application program and given to the requested application program so the requested application program may run utilizing the system resources.

Other types of events may cause a transfer of focus. Using one option, the cable headend may initiate a transfer of focus, for example, by a message (e.g., via e-mail or a system message) from the cable operator to the set top converter 16. Using another option, one applet or program may call another applet or program that also needs the focus, and give the focus to the called applet. In this case, both applets would still be registered with application launcher 32. When the calling applet gives the focus to the called applet, the called applet sends a message to application launcher 32 indicating that the called applet now has the focus.

The application launcher 32 may also designate one of the application programs 34, 36, 38 to be the default program. The default program will receive the system resources when no other application program has a request for the systems resources. Preferably, the default program is an electronic program guide, but it will be understood that any application may serve as the default application.

The system resources also change between application programs when the current application has terminated. Preferably, upon termination of an application program, the system's resources are returned to the default application.

Alternatively, the application launcher 32 may return the focus of the system resources to a previously running program rather than to the default program. In this embodiment, the application launcher 32 maintains a listing of the previously focused applications, and simply returns the focus to that previously focused application, if that previously focused application program gave up the system resources because of an event, such as the press of a hot key or the reception of an emergency broadcast signal. As applications terminate their operation, the application launcher returns the focus to the next application on the maintained list. Once all of the applications terminate operation, the application launcher preferably returns the focus to the default application. It will be recognized by those in the art that each application may maintain the Identifier of the previously running application, rather than a list of previous applications being maintained by the application launcher 32.

In yet another alternative embodiment of the present invention, the focus of system resources may occur based on priority levels. In this embodiment, each of the various application programs may be assigned a priority level, indicating each application program's necessity to obtain the system resources. For example, an emergency broadcast may be assigned the highest priority, and when an emergency broadcast signal is detected, it takes the focus from all other applications. In this alternative embodiment, as the focus changes from one application to another, the application launcher hands the system resources to the application program with the highest priority. As application programs terminate operation, the application launcher 32 will transfer the focus to the application program with the highest level of priority.

Figure 3:
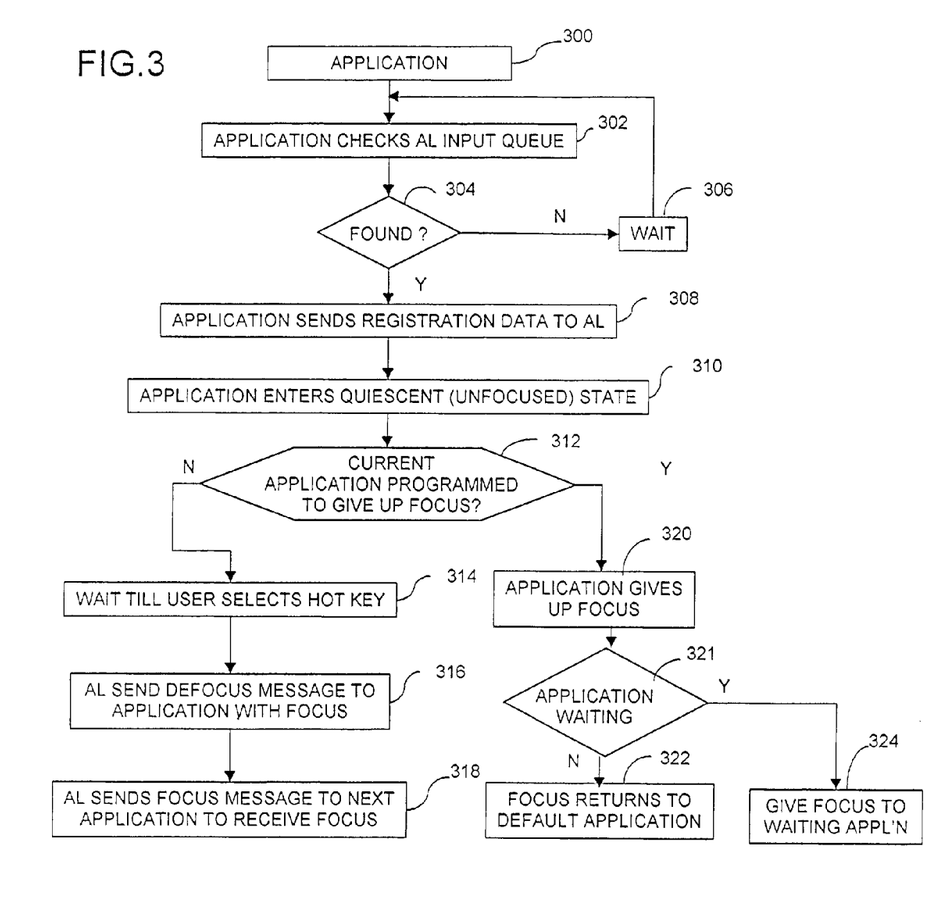
FIG. 3 is a flow chart diagram of the steps performed by the exemplary television converter system.

FIG. 3 is a flow chart diagram of the method performed by AL 32.

At step 300, a new application launcher compatible (AL-aware) application is loaded into the set top box and starts up. When an AL-aware application is built, it is made AL compatible by being given the identity of AL's input queue (queue name) as a starting point toward communicating with AL. AL sends responses to the queue identified in each request message. Focus change messages are requests sent by AL to the application's input queue, the identity and location of which is provided by the application to AL during the registration process. All sent messages conform to the standard message header format associated with the set top converter 16 in which the AL is installed.

At step 302, upon application startup, the AL-aware application begins by determining if AL's input queue exists. As previously described, the input queue has a fixed identification that all AL-aware applications know.

At step 304, if the AL input queue is found, then at step 308, the application registers with AL by sending a registration message to AL's input queue. This message contains information such as the identification of the input queue for the registering application, the textual name or other identification of the application (optionally along with a short description), application priority, and/or information about how the application would like to receive focus (e.g. tuning to a virtual channel or a series of possible keystrokes ("hot keys") on the keyboard 28 or remote 30), along with the application ID.

If the input queue is not found at step 304, then step 306 is executed. The application either waits for a predetermined period (or a random period calculated using a predetermined algorithm) and, returning to step 302, retries to find the input queue (with the expectation that AL will be started some time later). Some applications may be designed to operate in a non-AL environment if this is possible and useful.

At step 310, the application enters a quiescent state and waits to receive the focus.

AL sends a defocus message to the application that currently has the focus, and then sends a focus message to the application that is to receive the focus.

At step 312, the way in which the focus is transferred depends on whether the application currently having the focus is programmed to give up the focus automatically, or programmed to retain the focus until a defocus instruction is received.

At step 314, if the currently focused application is not programmed to automatically relinquish the focus, the next application requesting the focus waits for a message from AL indicating that it is receiving the focus. While waiting, the next application is in a quiescent or unfocused state. The application may or may not process keystrokes and timer messages when in this state, but it must operate in an invisible, background mode. The application may wait in this state until the user takes an action by, for example, selecting hot key on a remote control or wireless keyboard.

At step 316, when the user takes an action that results in a change in application focus (such as pressing the appropriate hot key), AL first sends a defocus message to the application that is about to lose focus. This is typically (but not necessarily) the application that is requesting the focus change. When in the active, focused state, an AL-aware application receives the defocus message, the application must relinquish its resources in order to allow the next application to receive focus and allocate the resources it needs to actively control the settop.

Then, at step 318, AL sends a focus message to the application that is receiving the focus. At this point, the next application is now in an active, focused state wherein its presence is typically evidenced by its control of the screen and other resources.

Applications can also cause themselves to lose focus and return the focus to the previous application or to a default application, such as the electronic program guide (EPG). Steps 320-324 show the procedure followed if the application that currently has the focus is programmed to relinquish the focus automatically upon the occurrence of an event, such as completion of a program routine.

At step 320, the application that currently has the focus relinquishes the focus by sending a self-defocus message to AL. In this way, an application can complete its function and return to the previously focused application.

At step 321, the action to be taken depends on whether there is an application waiting to receive the focus.

At step 322, if no application is waiting to receive the focus, then the focus returns to the default application. In the exemplary system, the default application is a navigator application At step 324, if an application is waiting to receive the focus, then the focus is transferred to the application that is waiting.

Figure 4:
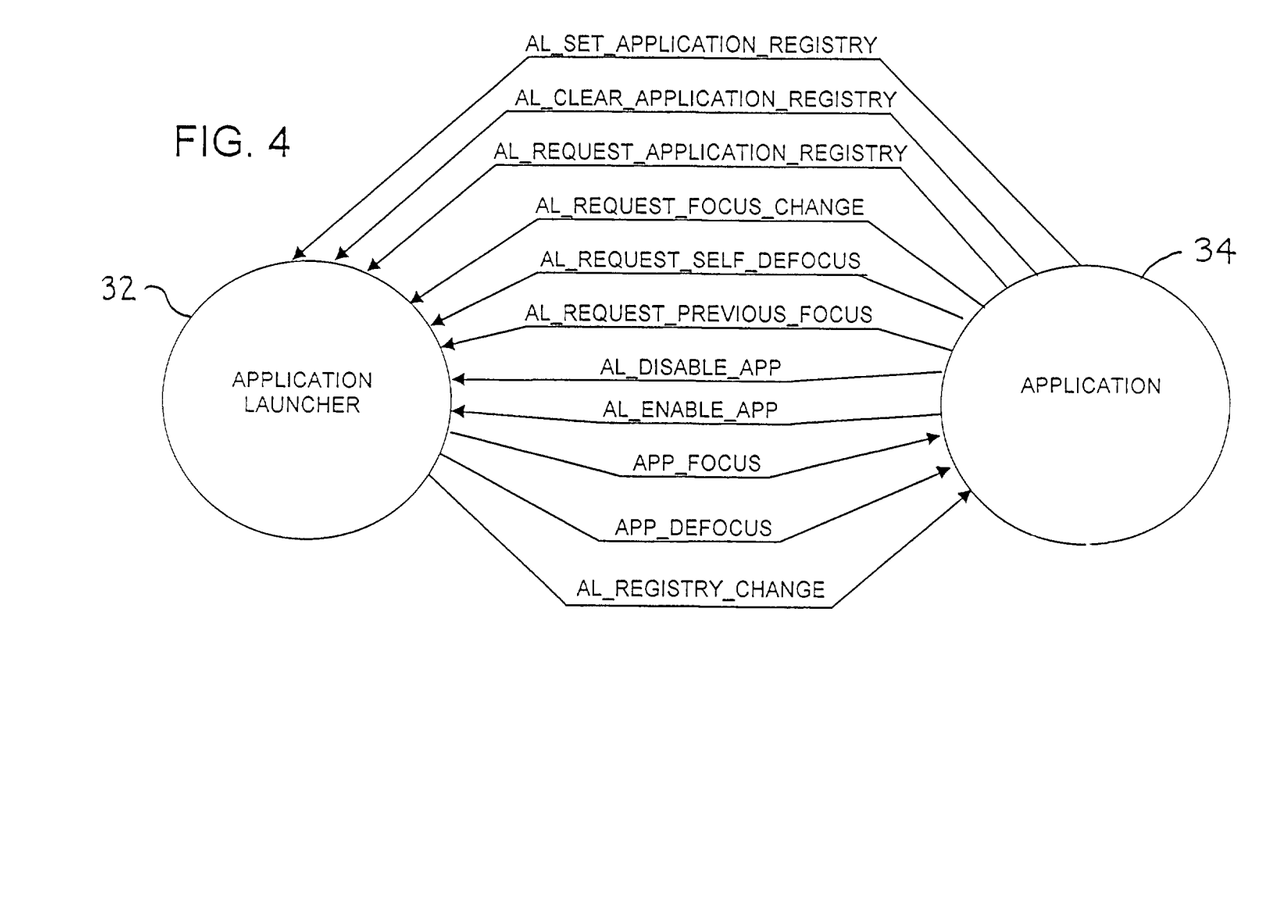
FIG. 4 is a data flow diagram showing the messages exchanged among the application launcher, application program and the electronic program guide.

Referring now to FIG. 4, a data flow diagram is depicted that shows the transmission of messages among AL 32 and one of the application programs 34. It will be further understood that the messages the present invention may utilize are not limited to the structure contained herein. Rather, the messages listed below are meant for descriptive purposes to show the purposes of the messages that may be transmitted in the present invention.

Application to AL Messages

An application registers with AL at startup by sending a unique message to AL, such as AL_SET_APPLICATION_REGISTRY. A registry structure in the message supplies the application's name, description, and launch methods. Upon receipt, AL responds with a message indicating that the message was successfully received, that the registry was full, or that the application is already registered. Examples of such messages are the following:

NO_ERROR/* 0: success */
MAX_REGISTERED/* −1: registry is full */
INVALID_REGISTRY/* −2: application is already registered */

If the operation is successful, AL also sends a registry change message to all registered applications, including the newly registered one, to reflect the change in the applications that are interfaced with the application launcher.

An application informs AL when it is about to be disabled using a unique message, such as AL_CLEAR_APPLICATION_REGISTRY, for example. The message includes the application identifier (AppID) in the message. AL first sends a "success" response as described above to the application indicating that the registry entry has been removed. Then, if the requesting application currently has the focus, an APP_DEFOCUS message is sent to cause the application to release its resources. AL then sends a registry change message to all currently registered applications An application can send a message to AL requesting registry information, such as by sending AL_REQUEST_APPLICATION_REGISTRY. The application supplies a pointer to a buffer and the buffer's length in the message. AL copies the current registry to the indicated buffer. In the response message, AL returns the original buffer pointer and the current size of the full registry. AL copies only as much of the registry as will fit in the specified buffer. If the returned size is greater than the originally specified buffer size, the caller should recognize that the registry data has been truncated. Specifying a buffer length of zero is valid and may be used as a way to determine the size of the buffer needed to hold the actual current registry. The maximum buffer size required is defined as MAX_REGISTRY_SIZE in the header file.

An application requests a change in focus from AL using a unique message, such as AL_REQUEST_FOCUS_CHANGE. The application specifies the AppID of the application to be launched, an indicator as to which launch method is being used, and whether this is a PUSH or POP (stack) operation. If called with a PUSH, the newly invoked application should save the AppID of the previously focused application so that on termination, it can return focus to that application via a POP operation. (As an alternative to using a PUSH-POP or last-in, first-out (LIFO) queue for determining which application gets the focus next, a first-in, first out (FIFO) queue may be used.)

AL sends an APP_DEFOCUS message to the application that currently has the focus. If that application does not respond within a predetermined period (e.g., three seconds), or refuses to relinquish the focus by returning an error, AL waits a short time (e.g., one tenth of a second) and then tries again, up to a predetermined number of times. If AL still cannot defocus the application, the defocusing part of this procedure is abandoned and AL continues with focusing the requested application (see below). Therefore, AL-compliant applications should be designed to relinquish the focus within a predetermined period (e.g., 10 seconds), to allow for granularity in timing. AL then sends an APP_FOCUS message to the application specified by the AppID parameter (even if that application already has the focus). If that application returns success, it is then considered to be the current application, otherwise the application can return an error indicating it cannot receive the focus (see description of APP_FOCUS message). If AL is not successful in setting the focus to the specified application, it sends an APP_FOCUS message to the default application (the navigator) if there is one.

AL sends a response message indicating success, the application is not registered, or an error message. Examples of such messages are as follows:

NO_ERROR/* 0: success */
INVALID_REGISTRY/* −1: application is not registered */
DISABLED_ERROR/* switching disabled (see AL_DISABLE_APPS)*/

An application relinquishes the focus using a defocus message, such as . AL_REQUEST_SELF_DEFOCUS. AL then sends an APP_DEFOCUS message to the initiating application and then sends an APP_FOCUS message to the default application, if there is one. AL responds with a message containing the result of the request. Examples of such messages are the following:

NO_ERROR/* 0: success */
INVALID_REGISTRY/* −1: application is not registered */
DISABLED_ERROR/* switching disabled (see AL_DISABLE_APPS)*/

An application can ask AL for the Application ID of the application previously having the focus by using a unique message, such as AL_REQUEST_PREVIOUS_FOCUS. AL returns the APPID of the application that contained the focus prior to the current application. Applications that wish to behave in a subroutine fashion (i.e. when terminating, return the focus to the application that previously had the focus) should request this information immediately after receiving the focus. When the application wants to return the focus to the previous application, it should send an AL_REQUEST_FOCUS_CHANGE message specifying the AppID obtained via this mechanism along with the PUSH/POP parameter set to POP. AL responds with a message indicating the result. Examples of such messages are the following:

NO_ERROR/* 0: success */
AL_DISABLE_APPS

AL to Application Messages
APP_FOCUS

AL sends a message, such as APP_FOCUS to notify an application that it now has the focus. The application can now try to obtain the resources that it needs and begin running in a focused state. If the PUSH/POP parameter in this message is set to PUSH, the application should immediately get the Application ID (AppID) of the previous application via the AL_REQUEST_PREVIOUS_FOCUS message. This way, if the application terminates on its own accord, it can return control to the previous application.

If the application cannot get the resources it requires, it should respond with a NOT_AVAILABLE error return message. This causes AL to send the application an APP_DEFOCUS message, which tells the application to release all its resources. If the application responds with an error message other than NOT_AVAILABLE, AL does not send a defocus message. Following this, AL pauses for a short time (e.g., one tenth of a second) and then again attempts to focus the application by sending it another APP_FOCUS message. AL tries a predetermined number of times (e.g., a total of four times) to give focus to the indicated application, unless the application is returning a NOT_AVAILABLE message, in which case AL tries indefinitely (i.e., till focus is accepted, or the converter 16 is turned off) to give focus to the application. The application preferably responds with a message containing the result. Examples of such messages are the following:

NO_ERROR/* 0: success, can accept focus */
NOT_AVAILABLE/* 0x8007: cannot acquire resources */
any other code/* cannot accept focus at this time */

AL uses a message, such as APP_DEFOCUS, to notify an application that the application is about to lose focus. If the application can safely give up the focus at this time, it must release the resources that it has, place itself in an unfocused state and respond with a success message. If the application cannot release focus at this time, it must return an error message and continue processing. If the application does not respond to this message within a predetermined period (e.g., three seconds), or refuses to relinquish the focus by returning an error message, AL waits a short time (e.g., one tenth of a second) and then tries again, up to a total of four times, after which the defocus operation is abandoned.

The application responds with the result message. Examples of such messages may be the following:

NO_ERROR/* 0: success */
any other code/* cannot defocus at this time—retry */

AL may use an unsolicited response message, such as AL_REGISTRY_CHANGE, to notify an application that the registry has changed. It is up to the application to request a copy of the registry if it requires the nature of the change. Note that this is a response message; therefore the application is not expected to send any message in return.

Although the exemplary embodiment of the invention is incorporated in a set top cable converter box 16 for a television, one of ordinary skill recognizes that the Application Launcher 32 may be practiced in a variety of systems. For example, although current converter boxes 16 are designed to be placed on a set top, the invention may be practiced in a converter having any type of mechanical packaging. Thus, the invention may be practiced in a space-saving converter box that is suspended above the television or located remotely from the television. Further, the converter box may receive broadcast signals from a source other than a cable distribution system. For example, the television signal that is converted may reach the converter box via a wireless radio frequency link or satellite. Further still, it is contemplated that the functions of the present invention performed by present day cable converter boxes may be incorporated into the housing of the television itself. Thus, the functions of the Application Launcher may reside inside the television.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a processor, the processor becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. A television signal converter system, comprising:
a receiver for receiving a transmission signal from a transmission signal source; and
a processor configured to provide an application launcher for managing system resources and to execute a plurality of applications, wherein each of the plurality of applications comprise one of two execution states, a first state being a focused execution state allowing access to all the system resources and a second state being a defocused execution state allowing access to only resources not required by an application having the focused execution state, and wherein the plurality of applications includes programmed launch requirements wherein at least one of the plurality of applications is programmed with launch requirements to relinquish the focused execution state automatically based on a priority of the application and at least one of the plurality of applications is programmed with the launch requirements to retain the focused execution state until receiving a command from a user that causes a defocus instruction from the application launcher that is not based on the priority of the application;
the processor registering the plurality of applications with the application launcher to provide the application launcher identification of each of the plurality of applications and the launch requirements of each of the plurality of applications, the processor further maintaining an input queue for receiving and storing input requests, analyzing the input requests to determine whether the application in the focused execution state requires defocusing and the application in the defocused execution state requires a change to the focused execution state, determining whether the application in the focused execution state that requires defocusing is programmed with the launch requirements to relinquish the focused execution state automatically based on the priority of the application or to retain the focused execution state until receiving the command from the user that causes the defocus instruction from the application launcher that is not based on the priority of the application and communicating with the plurality of applications to transfer execution states between the plurality of applications; and wherein the processor registers each of the plurality of applications with the application launcher by providing a registration message to the input queue of the application launcher, the registration message including an identification of the input queue for the application, an identification of the application, an identification of the priority associated with the application, and information about how applications are to receive focus, the information about how applications are to receive focus includes a PUSH/POP parameter that the application uses to retrieve an application id for a previous application such that the application identifies the previous application to return focus if the application terminates on its own.

2. The television signal converter system of claim 1, wherein the processor generates the application-defocus message to notify the application having the focused execution state to release the focus and generates an application-focus message to notify the application having the defocused execution state to enter the focused execution state.

3. The television signal converter system of claim 1, wherein the application launcher receives a self-defocus message from the application programmed with the launch requirements to relinquish the focused execution state automatically and generates an application-focus message to notify the application having the defocused execution state to enter the focused execution state.

4. The television signal converter system of claim 1, wherein an input request is received from a headend.

5. The television signal converter system of claim 1, wherein an input request is received from the user.

6. The television signal converter system of claim 1, wherein an input request is received from one of the plurality of applications.

7. The television signal converter system of claim 1, wherein the application launcher returns focus to one of the plurality of applications based on the priority provided to the application launcher upon registration of the plurality of applications.

8. A method for operating a television signal converter device, comprising:
  receiving a transmission signal from a transmission signal source;
  providing an application launcher for managing system resources and to control execution of a plurality of applications;
  configuring each of the plurality of applications to have one of two execution states, a first state being a focused execution state allowing access to all the system resources and a second state being a defocused execution state allowing access to only resources not required by an application having the focused execution state;
  providing the plurality of applications with programmed launch requirements wherein at least one of the plurality of applications is programmed with launch requirements to relinquish the focused execution state automatically based on a priority of the application and at least one of the plurality of applications is programmed with the launch requirements to retain the focused execution state until receiving a command from a user that causes a defocus instruction from the application launcher that is not based on the priority of the application;
  registering the plurality of applications with the application launcher to provide the application launcher identification of each of the plurality of applications and the launch requirements of each of the plurality of applications;
  maintaining an input queue at the application launcher for receiving and storing input requests;
  analyzing the input requests to determine whether the application in the focused execution state requires defocusing and the application in the defocused execution state requires a change to the focused execution state;
  determining whether the application in the focused execution state that requires defocusing is programmed with the launch requirements to relinquish the focused execution state automatically based on the priority of the application or to retain the focused execution state until receiving the command from the user that causes the defocus instruction from the application launcher that is not based on the priority of the application; and
  communicating with the plurality of applications to transfer execution states between the plurality of applications, wherein communicating with the plurality of applications to transfer execution states between the plurality of applications includes providing a registration message to the input queue at the application launcher, the registration message including an identification of the input queue for the application, an identification of the application, an identification of the priority associated with the application, and information about how applications are to receive focus, the information about how applications are to receive focus includes a PUSH/POP parameter that the application uses to retrieve an application id for a previous application such that the application identifies the previous application to return focus if the application terminates on its own.

9. The method of claim 8 further comprising generating an application-defocus message to notify the application having the focused execution state to release the focus and generating an application-focus message to notify the application having the defocused execution state to enter the focused execution state.

10. The method of claim 8 further comprising receiving, at the application launcher, a self-defocus message from the application programmed with the launch requirements to relinquish the focused execution state automatically and generating, by the application launcher, an application-focus message to notify the application having the defocused execution state to enter the focused execution state.

11. The method of claim 8, wherein the receiving an input request further comprises receiving the input request from a headend.

12. The method of claim 8, wherein the receiving an input request further comprises receiving the input request from the user.

13. The method of claim 8, wherein the receiving an input request further comprises receiving the input request from one of the plurality of applications.

14. The method of claim 8 further comprising returning, by the application launcher, focus to one of the plurality of applications based on the priority provided to the application launcher upon registration of the plurality of applications.

15. The method of claim 8 further comprising registering, by a processor, the plurality of applications with the application launcher by providing the registration message to the input queue of the application launcher, wherein the registration message includes an identification of the input queue for the registering application, an identification of the application, an identification of the priority associated with the application and the information about how applications are to receive focus.

* * * * *